United States Patent [19]

Sallay

[11] 3,891,658

[45] June 24, 1975

[54] N-PHENETHYL TRIALKYLMETHANOBENZ-AZOLINES

[75] Inventor: Stephen I. Sallay, Fort Wayne, Ind.

[73] Assignee: Purdue Research Foundation, West Lafayette, Ind.

[22] Filed: Mar. 20, 1974

[21] Appl. No.: 452,852

Related U.S. Application Data

[63] Continuation-in-part of Ser. No. 392,844, Aug. 29, 1973.

[52] U.S. Cl. ..... 260/293.54; 424/267; 260/DIG. 13
[51] Int. Cl. ............................................ C07d 39/00
[58] Field of Search ................. 260/293.54, DIG. 13

[56] References Cited
UNITED STATES PATENTS

| | | | |
|---|---|---|---|
| 3,639,407 | 2/1972 | Clarke et al. | 260/293.54 |
| 3,647,806 | 3/1972 | Cross | 260/293.54 |
| 3,700,734 | 10/1972 | Robinson et al. | 260/293.54 |
| 3,764,606 | 10/1973 | Akkerman et al. | 260/293.54 |

*Primary Examiner*—G. Thomas Todd
*Attorney, Agent, or Firm*—James L. Rowe; Everet F. Smith

[57] ABSTRACT

1,2,3,4,5,6-Hexahydro-3-($\beta$-phenenthyl)-2,6,11-trialkyl-2,6-methanobenzazocin-8-ols, analgetics.

3 Claims, No Drawings

N-PHENETHYL TRIALKYLMETHANOBENZ-AZOLINES

CROSS-REFERENCE

This application is a continuation-in-part of my co-pending application Ser. No. 329,844, filed Aug. 29, 1973.

BACKGROUND OF THE INVENTION

May and Murphy, *J. Org. Chem.*, 20, 157 (1955) first achieved the synthesis of benzazocines (benzomorphans). (Y and P = $CH_3$, X, Z, and Q = H in formula XX below.) The tricyclic system can be regarded as a simplified morphine structure.

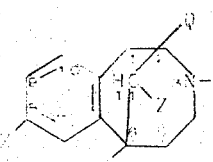

The compound had about one-half the analgesic activity of meperidine or of dromoran. In a continuation of this research program, May, *J. Org. Chem.*, 21, 899 (1956) prepared an N-phenylethyl analog (Y = $CH_3$, P = $CH_2CH_2C_6H_5$, X, and Z, and Q = H in formula XX), yielding a compound with about one-third the analgesic activity of the corresponding N-methyl compound. In a further extension of this work, May and Fry, *J. Org. Chem.*, 22, 1366 (1957) prepared compounds with a methyl group present on the endomethylene bridge (Y, Z, and P = $CH_3$, X and Q = H in formula XX). The corresponding 8-hydroxy compound (Y, Z, and P = $CH_3$, X = OH, Q = H in formula XX) was also prepared, and this latter compound was a potent analgesic with a relatively low toxicity. Eddy, Murphy and May disclosed a novel synthesis for compounds corresponding to XX wherein Y and P are $CH_3$, Q is H and X is permissibly hydroxy, in *J. Org. Chem.*, 22, 1370 (1957). Finally, May and Eddy in *J. Org. Chem.*, 24, 294 (1959) described two novel analgesic compounds in which, in formula XX, X = OH, Y and Z = $CH_3$, Q = H and P is either methyl or phenethyl. The compound in which P was methyl was resolved into *d* and *l* isomers with the levo isomer having an $ED_{50}$ of 1.7 mg./kg. The corresponding phenethyl derivatives (P = $CH_2CH_2C_6H_5$) on being resolved yielded a levo isomer and a dextro isomer both of which were analgesically active, the levo isomer being 20 times more potent than morphine. The dextro isomer had an $ED_{50}$ = 6.7 mg/kg and manifested a low physical dependence. This latter compound is now a marketed analgesic with the generic name phenazocine. The above work is also described in U.S. Pat. No. 3,138,603, which claims compounds according to formula XX wherein X = OH, Y and Z = $CH_3$, and P = H, $CH_3$ or $CH_2CH_2C_6H_5$, Q being H in all compounds. These same compounds were claimed by Gordon et al. in U.S. Pat. No. 2,959,594 but the claims were apparently lost in an interference between that patent and U.S. Pat. No. 3,138,603. Other Gordon patents include U.S. Pat. No. 2,924,603 which covers compounds of formula XX above wherein X = OH, Y and Z = $CH_3$, Q = H and P is a heterocyclic ethyl group such as pyridylethyl, thienylethyl, etc. and U.S. Pat. No. 3,033,867 in which nicotinyl esters of the compounds claimed by May in U.S. Pat. No. 3,138,603 are described. Archer, U.S. Pat. No. 3,250,678, claims compounds according to formula XX above in which one of Y and Z is ethyl, the other being hydrogen, methyl or ethyl, X = OH, Q = H and P = lower alkenyl containing 3–6 carbon atoms, particularly allyl and 3-methyl-2-butenyl. The patent also covers the marketed compound pentazocine in which X = OH, Y and Z = $CH_3$, Q = H, and P = 3-methyl-2-butenyl. A second Archer patent, U.S. Pat. No. 3,372,165, covers related compounds in which a cyclopropylmethyl side chain replaces the 3-methyl-2-butenyl of pentazocine (XX above wherein X = OH, Y and Z = $CH_3$, Q =H, and P = cyclopropylmethyl).

None of the cited literature discloses a single compound in which Q in formula XX is other than hydrogen. Furthermore, none of the syntheses described in the cited literature provides a synthetic procedure for the preparation of such a compound; in other words, the known synthetic procedures rely upon the absence during the ring closure reaction of any substituent group at the position to be occupied by Q in the benzazocine ring system before it is formed. Furthermore, there is no procedure known in the literature by which a substituent in Q-position could be introduced after the benzazocine ring-system is completed.

It is an object of this invention to provide 2-alkylbenzazocines active as analgesic substances and as analgesic antagonists.

SUMMARY OF THE INVENTION

This invention provides benzazocines of the following formula:

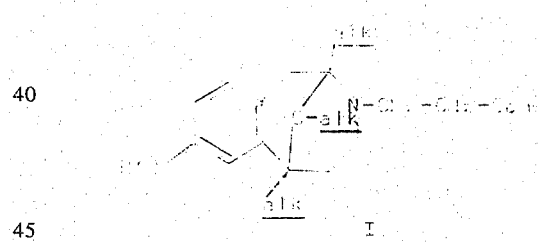

wherein each alk independently is $C_1$–$C_3$ alkyl and R' is H or alk. Also included within the scope of this invention are the pharmaceutically-acceptable acid addition salts of the bases represented by the above formula formed with non-toxic acids. These acid addition salts include salts derived from non-toxic inorganic acids including hydrochloric acid, nitric acid, phosphoric acid, sulfuric acid, hydrobromic acid, hydriodic acid and the like, as well as salts of non-toxic organic acids including acetic acid, maleic acid, fumaric acid, malic acid, succinic acid, tartaric acid, citric acid, benzoic acid, 2,4-dinitrobenzoic acid, p-chlorobenzoic acid, naphthoic acid, p-toluenesulfonic acid, methanesulfonic acid and the like.

In the above formula, the term $C_1$–$C_3$ alkyl includes methyl, ethyl and n-propyl.

The compounds of this invention are solids, and are usually isolated and purified in the form of an acid-addition salt. The compounds are prepared by a multi-step procedure whereby the tricyclic benzazocine ring structure containing the desired 2-alkyl substituents is built up from a tetralone to yield a compound of the above formula wherein R is H. The active analgetics and analgetic antagonists of this invention are prepared therefrom by standard alkylation procedures.

The compounds of this invention (I) are optically active in that each contains three asymmetric carbon atoms at positions 2, 6 and 11 of the benzazocine ring, (see formula XX for numbering) yielding theoretically 8 diastereoisomers. However, since the methano bridge can only be cis fused, one-half of the theoretical number of isomers are eliminated, leaving two pairs of diastereoisomers occurring as two racemates, the α-dl or less soluble racemate and the β-dl or more soluble racemate. Resolution of the racemate into its component d and l isomers can be accomplished by salt formation with an optically active acid and separation of the diastereoisomeric salt, by procedures well known in the art.

In synthesizing the compounds of the present invention, a 1-alkyl-7-alkoxy-2-tetralone (II) prepared by the procedure of Kuehne J. Am. Chem. Soc., 83, 1492–8 (1961) is alkylated with an allyl halide such as the bromide or chloride to produce the corresponding 1-alkyl-1-allyl-7-alkoxy-2-tetralone (III).

Next, the 2-tetralone is transformed to a β-keto ester by carbalkoxylation procedure using a dialkyl carbonate such as dimethylcarbonate or diethylcarbonate as the carbalkoxylating agent. As added solvent such as tetrahydrofurane may optionally be present. The β-keto ester thus prepared (IV) can be alkylated using conventional procedures employed with other β-keto esters to provide V which, after hydrolysis and spontaneous decarboxylation, yields a 3-alkyl-2-tetralone (VI).

The more roundabout procedure must be employed since direct alkylation of III provides a 3,3-dialkyl tetralone derivative.

Ozonolysis of the 1-allyl group of the 2-tetralone (VI) followed by reductive cleavage of the ozonide quantitatively produces the tetralin γ-keto aldehyde (VIII). Treatment of the keto aldehyde with a trace of alkali causes an intramolecular aldol condensation to take place, thus producing the tricyclic tetrahydro-5,8-methano-5-H-benzocyclohepten-10-one-7-ol derivative (IX).

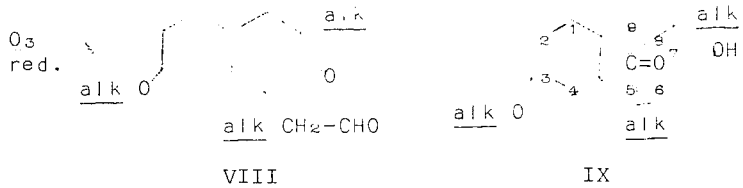

The benzocycloheptenolone IX represents a diastereoisomeric pair with a cis and a trans hydroxyl at the C₇ carbon (cis meaning that the hydroxyl is on the same side of the 7-membered ring as the methano bridge and trans meaning that the hydroxyl is on the opposite side of the 7-membered ring from the methano bridge).

Compound IX is the key intermediate for the production of compounds represented by formula I and the first step in the transformation of the benzocycloheptenolone (IX) to a compound of formula I is the protection of the 7-hydroxyl group via ether formation, preferably with tetrahydropyranyl ether. The tetrahydropyranyloxy compound (X) is subjected to a Wittig reaction in which a triphenyl phosphonium-methylide in a solvent such as dimethylsulfoxide replaced the 10-keto group with a methylene group, yielding the exomethylenebenzobicycloheptenyl ether (XI) in quantitative yield. Removal of the 7-hydroxy group readily produces the exomethylene ketone (XVI). The yield for the six step procedure (VI through XVI) is about 80 percent overall.

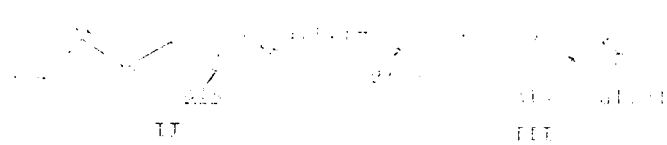

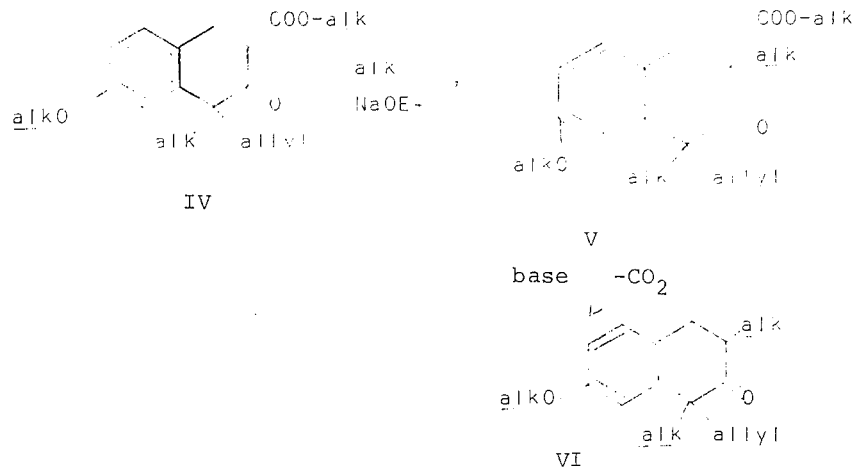

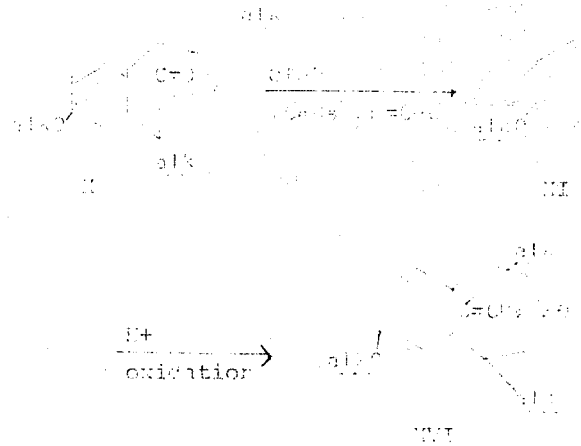

If higher $C_{10}$-alkylidene derivatives are desired, for example, the ethylidene or n-propylidene derivatives, the appropriate Wittig reagent is employed such as triphenyl phosphonium-ethylide of triphenyl phosphonium-n-propylide.

Next, the methylene linkage of XVI is reduced to yield either a cis $C_5$–$C_{10}$ diakly diastereoisomer or a trans $C_5$–$C_{10}$ dialkyl diastereoisomer (XVII), depending on the reduction conditions employed. Reduction of the exomethylene ketone XVI with a platinum-on-carbon catalyst yields predominantly the cis-$C_5$–$C_{10}$ dialkyl diastereoisomer of 6,7,8,9-tetrahydro-5,8-dialkyl-10-methyl-3-alkoxy-5,8-methano-(5H)-benzocyclohepten-7-one. Reduction of the 10-ethylidene or propylidene derivatives yields the corresponding cis-10-ethyl or cis-10-propyl compound.

As an alternative procedure, the corresponding pure trans isomer is prepared by a stereoselective hydroboration-oxidation reaction on the exomethylene compound (XI) to form an equatorially-oriented hydromethyl (methylol) group. The methylol hydroxyl is next esterified with p-toluenesulfonyl chloride in pyridine. Hydride reduction of the tosyl ester followed by acid hydrolysis of the ethereal linkage and oxidation of the $C_7$-hydroxyl yields directly the trans-$C_5$–$C_{10}$ dialyl diastereoisomer of 6,7,8,9-tetrahydro-5,8-dialkyl-10-methyl-3-alkoxy-5,8-methano-(5H)-benzocyclohepten-7-one (XVII). Higher $C_{10}$-alkyl derivatives having a trans configuration are prepared in similar fashion. Both the cis and trans-$C_5$–$C_{10}$ dialkyl derivatives are represented by XVII.

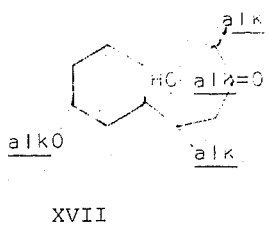

XVII

Next, the tricyclic ketone XVII of either cis or trans configuration is converted to the oxime with hydroxylamine. Because of the hindrance of the $C_8$-alkyl group, only the anti-oxime is formed. At the oxime stage the two $C_{10}$-diastereoisomers can be separated by crystallization. Beckmann rearrangement of each oxime proceeds readily to yield the lactam diastereoisomers (XIX).

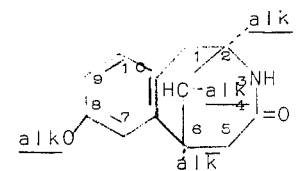

XIX

Lithium aluminumhydride reduction of the lactam XIX yields directly the desired 8-alkoxy tricyclic secondary amine (XX) wherein P = H, X = R'O, and Y, Q, R' and Z = alk.

The 8-alkyl ether is then transformed to the corresponding hydroxy compound by treatment with pyridinium hydrochloride to yield the desired aminophenol starting material (I) wherein R and R' = H.

The above procedure can also be used to synthesize a benzazocine (XX) in which Y and Z = $CH_3$, and X = OH and Q and P = H. Alkylation of this particular derivative on the $N_3$ yields, among other compounds, pentazocine. In preparing compounds in which Q is H (rather than alkyl as in applicant's compound), the tetralone alkylation steps (IV → VI) can be obviated and (III) can be ozonized directly to yield a γ-keto aldehyde which undergoes an intramolecular condensation to give a methano-bridged compound.

The analgetic compounds of this invention are prepared by alkylating the secondary amine (XX) with phenethylbromide or chloride. Preferably, however, the secondary amine is acylated with phenacetylchloride and the corresponding amide reduced with $LiAlH_4$ or the like to yield an N-phenethyl derivative.

This invention is further illustrated by the following specific examples.

EXAMPLE 1

3,4-Dihydro-1-methyl-1-allyl-7-methoxynaphthalen-2(1H)-one

A solution of 57.0 g. 1-methyl-7-methoxy-2-tetralone prepared by the method of M. E. Kuehne, *J. Am. Chem.*

Soc., 83, 1492–8, 1961 in 50 ml. of dry tetrahydrofuran was slowly dropped into a suspension of 7.2 g. sodiumhydride in 200 ml. of dry tetrahydrofuran. The exothermic reaction was controlled by external cooling between 35°–45°C. After the hydrogen evolution subsided, the solution was cooled to about +15°C. and treated with 37.4 g. allylbromide. The temperature of the reaction was kept between 30°–40°C. After the addition of the allylbromide had been completed, the reaction mixture was stirred for about 12 hours at room temperature. NaBr, produced in the above reaction was separated by filtration and the reaction mixture was evaporated to dryness. The residue was dissolved in ether, the ether solution extracted with water, dried and evaporated in vacuo to an orange-colored oil. The residual oil was distilled in vacuo to yield 64.5 g. 3,4-dihydro-1-methyl-1-allyl-7-methoxy-naphthalen-2(1H)-one distilling in the range 119°–120°C./.005 mm Hg. The IR spectrum exhibited bands at 3.27μ(—CH=CH$_2$), 5.86μ(>C=O) and 6.02μ(—HC=CH$_2$); NMR (CDCl$_3$) showed chemical shifts at δ1.40 (s, 3H, >C—CH$_3$), δ 3.77 (s, 3H, —OCH$_3$), and δ 5.20 (m, 3H, —CH=CH$_2$).

Following the above procedure, but substituting 1-ethyl-7-methoxy-2-tetralone for 1-methyl-7-methoxy-2-tetralone, one obtains 3,4-dihydro-1-ethyl-1-allyl-7-methoxynaphthalen-2(1H)-one.

EXAMPLE 2

3,4-Dihydro-1-methyl-1-allyl-3-carbomethoxy-7-methoxy-naphthalen-2(1H)-one 62.0 g. of 3,4-dihydro-1-methyl-1-allyl-7-methoxynaphthalen-2-(1H)-one prepared by the procedures of Example 1, was dropped into a suspension of 6.5 g. of sodium hydride in 250 ml. of dimethylcarbonate and the resulting mixture gently refluxed until hydrogen evolution had subsided. The reaction mixture was cooled, and diluted with ether. The ether layer was extracted with water, separated and dried. Distillation yielded 65.8 g. of 3,4-dihydro-1-methyl-1-allyl-3-carbomethoxy-7-methoxy-naphthalen-2(1H)-one boiling in the range 146°–149°C./0.01 mm. Hg. $\lambda_{max}^{film}$ = 5.72μ (ester), 5.83 μ(ketone); 6.01μ(>C=C—COOCH$_3$). The product exhibited an intensive dark violet color with ferric chloride.

EXAMPLE 3

3,4-Dihydro-1-methyl-1-allyl-3-carbethoxy-7-methoxy naphthalen-2(1H)-one

Following the above procedure but substituting diethylcarbonate for dimethylcarbonate there is obtained 3,4-dihydro-1-methyl-1-allyl-3-carbethoxy-7-methoxy-naphthalen-2(1H)-one. B.p.=149°–152°C./0.001 m Hg.; $\lambda_{max}^{film}$=3.26μ(—CH=CH$_2$), 5.73μ(ester); 5.85μ(ketone); 6.03μ(>C=C—COOEt).

Following the above procedure but substituting 3,4-dihydro-1-ethyl-1-allyl-7-methoxy-naphthalen-2-(1H)-one for 3,4-dihydro-1-methyl-1-allyl-7-methoxy-naphthalen-2(1H)-one in molar equivalent amount there is obtained 3,4-dihydro-1-ethyl-1-allyl-3-carbomethoxy-7-methoxy-naphthalen-2(1H)-one.

EXAMPLE 4

3,4-Dihydro-1,3-dimethyl-1-allyl-3-carbomethoxy-7-methoxy-naphthalen-2(1H)-one

Procedure A.

A solution of 56.5 g. of 3,4-dihydro1-methyl-1-allyl-3-carbomethoxy-7-methoxy-naphthalen-2-(1H)-one in about 50 ml. of tetrahydrofuran was slowly added to a stirred suspension of 4.7 g. sodium hydride in about 250 ml. tetrahydrofuran. The reaction temperature was kept between 20°–25°C. After the hydrogen evolution had ceased, 42.0 g. methyliodide were added to the reaction mixture within a few minutes. The temperature was maintained between 30°–40°C. After the exothermic reaction had subsided, the reaction mixture was stirred at room temperature overnight. Inorganic substances were filtered off, and the solvent was evaporated in vacuo. The resulting oily residue was dissolved in ether, and the ether solution extracted with water, dried, filtered and evaporated in vacuo. The residual orange-yellow oil was distilled. 3,4-dihydro-1,3-dimethyl-1-allyl-3-carbomethoxy-7-methoxy-naphthalen-2(1H)-one prepared by the above procedure boiled in the range 150°C./0.01 mm Hg. Yield=55.0 g. The IR spectrum exhibited bands at 3.2μ(>C=CH$_2$), 5.77μ(ester), 5.85μ(ketone). Ferric chloride test was negative.

Procedure B.

12.8 g. of 3,4-dihydro-1-methyl-1-allyl-7-methoxy-naphthalen-2(1H)-one was introduced into a suspension of 1.4 g. sodium hydride in about 75 ml. of dimethylcarbonate. The resulting mixture was gently refluxed until the hydrogen evolution had subsided. The reaction mixture was cooled and directly treated with 16.0 g. methyliodide at a temperature between 25°–40°C. Sodium iodide separated while the reaction mixture was stirred overnight at room temperature. Ether was added, the inorganic salt separated by filtration, and the filtrate evaporated to dryness. The oily residue was distilled to yield 3,4-dihydro-1,3-dimethyl-1-allyl-3-carbomethoxy-7-methoxy-naphthalen-2(1H)-one boiling at 150°C./0.015 mm. and identical with the product obtained by Procedure A of this Example.

Following the above procedure but substituting ethyliodide in molar equivalent amount during the alkylation step for methyliodide there is obtained 3,4-dihydro-1-methyl-3-ethyl-1-allyl-3-carbomethoxy-7-methoxy-naphthalen-2(1H)-one.
B.P.=113°–114°C./0.001 mm. Hg; $\lambda_{max}^{film}$ = 5.75μ(—COOCH$_3$), 5.88μ(>C=O); NMR (CDCl$_3$) δ 1.15(t, 3H), δ3.68 (s, 3H), δ3.80 (s, 3H), δ5.0 (m, 3H).

3,4-Dihydro-1-methyl-3-propyl-1-allyl-3-carbomethoxy-7-methoxynaphthalene-2 (1H)-one was prepared in similar fashion and distilled at 142°C./0.01 mm Hg; $\lambda_{max}^{CHCl_3}$=5.70μ (ester), 5.80μ (ketone), 6.05μ (—CH=CH$_2$). NMR (CDCl$_3$) exhibited chemical shifts at δ3.68 (s,—COOCH$_3$), δ3.81 (s, —OCH$_3$), δ5.03 (m, —CH=CH$_2$). Mass spectrum showed the following major fragmentations m/e 330 (M$^+$), 314, 289, 287, 273, 257, 229 (base), 201, 173.

Analysis for C$_{20}$H$_{26}$O$_4$: Calc.; C, 72.70; H, 7.93%. Found; C, 72.99; H, 8.07%.

Following the above procedure, but substituting 3,4-dihydro-1-ethyl-1-allyl-3-carbomethoxy-7-methoxy-naphthalen-2(1H)-one for 3,4-dihydro-1-methyl-1-allyl-3-carbomethoxy-7-methoxy-naphthalen-2-(1H)-one, there is produced 3,4-dihydro-3-methyl-1-ethyl-1-allyl-3-carbomethoxy-7-methoxy-naphthalen-2(1H)-one and 3,4-dihydro-1,3-diethyl-1-allyl-3-carbomethoxy-7-methoxy-naphthalen-2(1H)-one(V).

EXAMPLE 5

3,4-Dihydro-1,3-dimethyl-1-allyl-7-methoxy-naphthalen-2(1H)-one

A solution of 59.0 g. of 3,4-dihydro-1,3-dimethyl-3-carbomethoxy-7-methoxy-naphthalen-2(1H)-one in 450 ml. of 5% KOH/methanol was refluxed for 1–5 hours. $K_2CO_3$ deposited during the reaction and was removed by filtration. The methanolic filtrate was evaporated to dryness. The resulting oily residue was disolved in ether, and the ether solution washed with water, and dried. The dired ethereal solution was distilled in vacuo, and the fraction boiling in the range 131°–133°C./0.06 mm Hg. collected, the yield was 45.1 g. of 3,4-dihydro-1,3-dimethyl-1-allyl-7-methoxy-naphthalen-2(1H)-one; b.p. = 121°–124°C./0.001 mm Hg. (glc purity = 91.5°%); $\lambda_{max}^{film}$ = 3.23μ(—CH=CH$_2$); 5.85μ(>C=O), 6.02μ(—CH=CH$_2$); NMR (CDCl$_3$) exhibited chemical shifts at δ1.05 (d, 3H; J=7 cps), δ1.43 (s, 3H), δ3.78 (s, 3H), δ5.10 (m, 3H).

Mass spectrum showed the following major fragment ions: m/e 244 (M$^+$), 229, 203, 175 (base).
Analysis for $C_{16}H_{20}O_2$, 244.32 requires: C, 78.63; H, 8.23%. found: C, 78.41; H, 8.08%.

Following the above procedure, but substituting for 3,4-dihydro-1,3-dimethyl-1-allyl-3-carbomethoxy-7-methoxy-naphthalen-2-(1H)-one an appropriately substituted 3,4-dihydro-1,3-dialkyl-1-allyl-3-carbomethoxy-7-methoxy-naphthalen-2(1H)-one, there is produced 3,4-dihydro-1-methyl-3-ethyl-1-allyl-7-methoxy-naphthalen-2-(1H)-one b.p. 118°C./0.001 mm. Hg.; $\lambda_{max}^{film}$ = 5.87μ(>C=O); NMR (CDCl$_3$) δ0.98 (t, 3H), δ1.02 (t, 3H), δ1.35 (s, 3H), δ1.43 (s, 3H), δ3.80 (s, 3H), δ5.20 (m, 3H).

Mass spectrum exhibited the following major fragment ions m/e 258 (M$^+$), 217, 189 (base).

Analysis for $C_{17}H_{22}O_2$, 258.35 requires: C, 79.03; H, 8.58%. found: C, 78.78; H, 8.56%.

3,4-Dihydro-1-methyl-3-propyl-1-allyl-7-methoxynaphthalene-2-(1H)-one was obtained in similar fashion; b.p. 140°C/0.1 mm Hg; $\lambda_{max}^{CHCl_3}$ = 5.82μ (ketone), 6.05μ (—CH=CH$_2$). NMR (CDCL$_3$) possessed chemical shifts at δ3.75 (s, —OCH$_3$), δ5.15 (m, —CH=CH$_2$). Mass spectrum exhibited the following major fragment-ions m/e 272 (M$^+$), 245, 231, 203 (base), 187, 175, 173, 161.

3,4-Dihydro-3-methyl-1-ethyl-1-allyl-7-methoxyanphthalen-2(1H)-one, 3,4-dihydro-1,3-diethyl-1-allyl-7-methoxynaphthalen-2-(1H)-one and 3,4-dihydro-3-methyl-1-n-propyl-1-allyl-7-methoxynaphthalen-2(1H)-one are prepared in similar fashion.

EXAMPLE 6

1,2,3,4-Tetrahydro-1,3-dimethyl-7-methoxy-2-oxo-1-naphthalene-acetaldehyde

A solution of 28.8 g. of 3,4-dihydro-1,3-dimethyl-1-allyl-7-methoxy-naphthalen-2(1H)-one in 300 ml. of dichloromethane was ozonized between −20° and −75°C. After the ozonization of the allylic side chain was complete, 75 ml. of acetic acid were added to the reaction mixture. The ozonide was then reductively cleaved by the addition of 22 g. zinc dust which was added in small batches to the vigorously stirred reaction mixture. The temperature was maintained in the range 20°–30°C. After the ozonide was cleaved, the reaction mixture was filtered, and the organic layer was twice extracted with water and once with sodium bicarbonate solution thereby removing the last trace of acetic acid. The organic layer was dried, filtered and evaporated to dryness. The residue, comprising 1,2,3,-4-tetrahydro-1,3-dimethyl-7-methoxy-2-oxo-1-naphthalene-acetaldehyde, was distilled at 150°–155°C./0.01 mm. Hg.; yield (several runs) = 86–94; $\lambda_{max}^{film}$ = 3.63μ (—CHO), 5.83μ (aldehyde oxo), 5.88μ (ketone). Mass spectrum exhibited the expected molecular ion m/e at fragment peaks occurred at m/e 204, 203, 202, 175 and 161.

Following the above procedure, but substituting for 3,4-dihydro-1,3-dimethyl-1-allyl-7-methoxy-naphthalen-2(1H)-one an appropriate 3,4-dihydro-1,3-dialkyl-1-allyl-7-methoxy-naphthalen-2(1H)-one, there is produced 1,2,3,4-tetrahydro-1-methyl-3-ethyl-7-methoxy-2-oxo-1-naphthalene-acetaldehyde b.p. 125°C./0.001 mmg. Hg.; $\lambda_{max}^{film}$ = 3.65μ (—CHO), 5.80μ (—CHO), 5.85μ (C=O); NMR (CDCl$_3$) δ1.0 (t, 3H), δ1.50 (s, 3H), δ3.80 (s, 3H), δ12.1 (m, 1H). Mass spectrum exhibited a molecular ion m/e at 260 (M$^+$) and the following major fragment ions: m/e 246, 218, 217, 216, 189, 176, 175, 162 and 161 (base).

1,2,3,4-tetrahydro-1-ethyl-3-n-propyl-7-methoxy-2-oxo-1-naphthalene-acetaldehyde;
1,2,3,4-tetrahydro-3-methyl-1-ethyl-7-methoxy-2-oxo-1-naphthalene-acetaldehyde and 1,2,3,4-tetrahydro-1,3-diethyl-7-methoxy-2-oxo-1-naphthalene-acetaldehyde can be prepared in similar fashion.

EXAMPLE 7

6,7,8,9-Tetrahydro-5,8-dimethyl-3-methoxy-5,8-methano-5H-benzocycloheptene-7-ol-10-one A solution of 28.6 g. of 1,2,3,4-tetrahydro-1,3-dimethyl-7-methoxy-2-oxo-1-naphthalene-acetaldehyde in 400 ml. of methanol was treated with 200 ml. of 2% KOH-methanol. The reaction mixture was left at room temperature for 16 hours. The solvent was evaporated in vacuo, and the resulting residue was dissolved in ether. The ether extract was in turn extracted with 10% hydrochloric acid at 0°C. and then with water. The ether solution was dried and evaporated to yield a residue comprising 6,7,8,9-tetrahydro-5,8-dimethyl-3-methoxy-5,8-methano-5H-benzocycloheptene-7-ol-10-one; weight 27.6 g.; $\lambda_{max}^{film}$ = 2.88μ(strong OH), 5.75μ(five-membered ketone).

Following the above procedure, but substituting for 1,2,3,4-tetrahydro-1,3dimethyl-7-methoxy-2-oxo-1-naphthalene-acetaldehyde the appropriate 1,2,3,4-tetrahydro-1,3-dialkyl-7-methoxy-2-oxo-1-naphthalene-acetaldehyde, one obtains 6,7,8,9-tetrahydro-5-methyl-8-ethyl-3-methoxy-5,8-methano-5H-benzocycloheptene-7-ol-10 -one; yield 96.5%; $\lambda_{max}^{film}$ 2.80μ(—OH), 5.75μ(five-membered ketone).

Similarly, 6,7,8,9-tetrahydro-5-ethyl-8-n-propyl-3-methoxy-5,8-methano-5H-benzocycloheptene-7-ol-10-one; 6,7,8,9-tetrahydro-8-methyl-5-ethyl-3-methoxy-5,8-methano-5H-benzocycloheptene-7-ol-10-one, 6,7,8,9-tetrahydro-5,8-diethyl-3-methoxy-5,8-methano-5H-benzocycloheptene-7-ol-10-one and 6,7,-8,9-tetrahydro-5-methyl-8-n-propyl-3-methoxy-5,8-methano-5H-benzocycloheptene-7-ol-10-one can be synthesized from the appropriate starting material.

EXAMPLE 8

6,7,8,9-Tetrahydro-5,8-dimethyl-3-methoxy-7-(tetrahydro-2-pyranyloxy)-5,8-methano-5H-benzocyclohepten-10-one 27.6 g. of 6,7,8,9-tetrahydro-5,8-dimethyl-3-methoxy- 5,8-methano-5H-benzocycloheptene-7-ol-10-one were dissolved in about 50 ml. of dihydropyran. A few crystals of p-toluenesulfonic acid were added. The resulting exothermic reaction was controlled by a cooling bath, and the internal temperature was kept below 35°C. After the exothermic reaction had subsided, the mixture was allowed to stand for another 4 hours at room temperature, and was then diluted with ether. The ether layer was separated and extracted by sodium bicarbonate solution, dried, filtered and evaporated to dryness, yielding as a residue the crude tetrahydropyranyl ether of 6,7,8,9-tetrahydro-5,8-dimethyl-3-methoxy-7-(tetrahydro-2-pyranyloxy)-5,8-methano-5H-benzocyclohepten-10-one; $\lambda_{max}^{film}$ = 5.7$\mu$(sharp >C=O), 9.20–9.60$\mu$(acetal), no hydroxyl absorption; quantitative yield.

Following the above procedure, but substituting for 6,7,8,9-tetrahydro-5,8-dimethyl-3-methoxy-5,8-methano-5H-benzocycloheptene-7-ol-10-one the appropriate 6,7,8,9-tetrahydro-5,8-dialkyl-3-methoxy-5,8-methano-5H-benzocycloheptene-7-ol-10-one, one obtains 6,7,8,9-tetrahydro-5-methyl-8-ethyl-3-methoxy-7-(tetrahydro-2-pyranyloxy-5,8-methano-5H-benzocycloheptene-10-one, 6,7,8,9-tetrahydro-5-ethyl-8-methyl-3-methoxy-7-(tetrahydro-2-pyranyloxy)-5,8-methano-5H-benzocycloheptene-10-one, 6,7,8,9-tetrahydro-5,8-diethyl-3-methoxy-7-(tetrahydro-2-pyranyloxy)-5,8-methano-5H-benzocycloheptene-10-one, 6,7,8,9-tetrahydro-5-methyl-8-propyl-3-methoxy-7-(tetrahydro-2-pyranyloxy)-5,8-methano-5H-7-(tetrahydro-2-pyranyloxy)-5,8-methano-5H-benzocyclohexene-10-one ect.

EXAMPLE 9

6,7,8,9-Tetrahydro-5,8-dimethyl-3-methoxy-7-(tetrahydro-2-pyranyloxy)-10-methylene-5,8-methano-5H-benzocycloheptene Eighty-one and six-tenths grams of triphenylmethylphosphonium bromide were introduced into a solution of dimsylsodium within 15 minutes. The dimsylsodium was prepared from 5.5 g. of sodium hydride and 500 ml. of dry dimethylsulfoxide. The reaction temperature was kept between 18°–23°C. under a nitrogen blanket. The yellow colored triphenylphosphoniummethylide thus produced was stirred at room temperature for an additional hour and then treated with a solution of 50.3 g. of 6,7,8,9-tetrahydro-5,8-dimethyl-3-methoxy-7-(tetrahydro-2-pyranyloxy)-5,8-methano-5H-benzocycloheptene-10-one in 100 ml. of dimethylsulfoxide. The addition took about 10 minutes, and the moderately exothermic reaction was kept at a temperature in the range 24°–35°C. The dark brown reaction mixture was stirred for an additional hour between 40°–50°C. and stored at room temperature overnight. The mixture was then poured onto an ice-water mixture and thoroughly extracted with hexane. Triphenylphosphoniumoxide formed as a by-product in the reaction was insoluble in both water and aliphatic hydrocarbons and was separated by filtration. The dried organic filtrate was evaporated to dryness in vacuo leaving a residual yellow gum comprising 6,7,8,9-tetrahydro-5,8-dimethyl-3-methoxy-7-(tetrahydro-2-pyranyloxy)-10-methylene-5,8-methano-5H-benzocycloheptene. The compound was obtained in practically quantitative yield. Spectrocopic evidence indicated a high level of purity, and thus the product was used in the succeeding step without further purification. Infrared spectrum exhibited absorption bands at 3.23$\mu$ and 6.03$\mu$(>CH$_2$) and showed no oxo band.

Following the above procedure, but substituting for 6,7,8,9-tetrahydro-5,8-dimethyl-3-methoxy-7-(tetrahydro-2-pyranyloxy)-5,8-methano-5H-benzocycloheptene-10-one an appropriate 6,7,8,9-tetrahydro-5,8-dialkyl-3-methoxy-7-(tetrahydro-2-pyranyloxy)-5,8-methano-5H-benzocycloheptene-10-one, one can obtain 6,7,8,9-tetrahydro-5-methyl-8-ethyl-3-methoxy-7-(tetrahydro-2-pyranyloxy)-10-methylene-5,8-methano-5H-benzocycloheptene; $\lambda_{max}^{film}$ = 3.20$\mu$ and 6.0$\mu$(>C=CH$_2$); Yield 89%.

The following related compounds can be prepared in similar fashion; 6,7,8,9-tetrahydro-5-methyl-8-propyl-3-methoxy-7-(tetrahydro-2-pyranyloxy)-10-methylene-5,8-methano-5H-methano-5H-benzocycloheptene; 6,7,8,9-tetrahydro-8-methyl-5-ethyl-3-methoxy-7-(tetrahydro-2-pyranyloxy)-10-methylene-5,8-methano-5H-benzocycloheptene and 6,7,8,9-tetrahydro-5,8-diethyl-3-methoxy-7-(tetrahydro-2-pyranyloxy)-10-methylene-5,8-methano-5H-benzocycloheptene.

EXAMPLE 10

6,7,8,9-Tetrahydro-5,8-dimethyl-3-methoxy-10-methylene-5,8-methano 5H-benzocycloheptene-7-ol A solution of 28.1 g. of 6,7,8,9-tetrahydro-5,8-dimethyl-3-methoxy-7-(tetrahydro-2-pyranyloxy)-10-methylene- 5,8-methano-5H-benzocycloheptene in 300 ml. of 5% ethanolic oxalic acid containing 10 ml. of water was refluxed for 5 hours. The evaporated reaction mixture was dissolved in benzene, and the benzene solution extracted with dilute aqueous sodium hydroxide and water. The benzene solution was separated and dried. Evaporation in vacuo yielded residue of 21.0 g. of an orange-colored gum comprising 6,7,8,9-tetrahydro-5,8-dimethyl-3-methoxy-10-methylene-5,8-methano-5H-benzocycloheptene-7-ol; $\lambda_{max}^{film}$ 2.95$\mu$(OH), 3.27$\mu$ and 6.03$\mu$(>C=CH$_2$).

Following the above procedure, but substituting for 6,7,8,9-tetrahydro-5,8-dimethyl-3-methoxy-7-(tetrahydro-2-pyranyloxy)-10-methylene-5,8-methano-5H-benzocycloheptene an appropriate 6,7,8,-9-tetrahydro-5,8-dialkyl-3-methoxy-7-(tetrahydro-2-pyranyloxy)-10-methylene-5,8-methano-5H-benzocycloheptene, one can obtain 6,7,8,9-tetrahydro-5-methyl-8-ethyl-3-methoxy-10-methylene-5,8-methano-5H-benzocycloheptene-7-ol b.p.=131°C./0.004 mm. Hg.; $\lambda_{max}^{CHCl_3}$ = 2.80, 2.90$\mu$(—OH), 6.05$\mu$(>C=CH$_2$); NMR, (CDCl$_3$) $\delta$1.03 (t, 3H), $\delta$1.48 (s, 3H), $\delta$3.77 (s, 3H), $\delta$4.77 and 4.80 (two singlets for >C=CH$_2$).

Mass spectrum shows the M$^+$-ion m/e at 258 and fragment ions at m/e 243, 226, 225, 214, 211, 199 and 185 (base).

Analysis for C$_{17}$H$_{22}$O$_2$, 258.35 requires: C, 79.03; H, 8.50%. found: C, 78.93; H, 8.86%.

6,7,8,9-Tetrahydro-5-ethyl-8-n-propyl-3-methoxy-10-methylene-5,8-methano-5H-benzocycloheptene-7-ol, 6,7,8,9-tetrahy--5-methyl-8-n-propryl-3-methoxy-10-methylene-5,8-methano-5H-benzocycloheptene-7-ol, 6,7,8,9-tetrahydro-8-methyl-5-ethyl-3-methoxy-10-methylene-5,8-methano-5H-benzocycloheptene-7-ol and 6,7,8,9-tetrahydro-5,8-diethyl-3- methoxy-10-methylene-5,8-methano-5H-benzocycloheptene-7-ol can be prepared in similar fashion.

EXAMPLE 11

6,7,8,9-Tetrahydro-5,8-dimethyl-3-methoxy-10-methylene 5,8-methano-5-H-benzocycloheptene-7-one A solution of 28.3 g. of 6,7,8,9-tetrahydro-5,8-dimethyl-3-methoxy-10-methylene-5,8-methano-5-H-benzocycloheptene-7-ol in 50 ml. pyridine was slowly introduced into a slurry of 23.0 g. of $CrO_3$ in 300 ml. pyridine. The reaction mixture was stirred at room temperature for about 16 hours and was then diluted with ether. Inorganic material was separated by filtration. The filtrate was evaporated to a dark syrup which was extracted with ether. The ethereal extract was washed with dilute hydrochloric acid and water and was then dried. Evaporation of the solvent in vacuo yielded crude 6,7,8,9-tetrahydro-5,8-dimethyl-3-methoxy-10-methylene-5,8-methano-5H-benzocycloheptane-7-one in quantitative yield, which crystallized upon standing. After recrystallization from ethanol-hexane, the compound melted at 84°–85.5°C. $\lambda_{max}^{CHCl_3}$ = 5.75$\mu$(>C=O), 6.0$\mu$(C=CH$_2$); NMR (CDCl$_3$) $\delta$1.29 (s, 3H), $\delta$1.79 (s, 3H), $\delta$2.44 (s, 1H), $\delta$ 2.49 (s, 1H), $\delta$2.90 (s, 1H), $\delta$2.95 (s, 1H), $\delta$3.77 (s, 3H), $\delta$4.91 (s, 1H), $\delta$5.01 (s, 1H).

Mass spectrum exhibited the following major fragment ions: m/e = 242 (M$^+$), 227, 200, 199 and 185 (base).

Analysis for $C_{16}H_{18}O_2$, 242.30 requires: C, 79.31; H, 7.49%. found: C, 79.10; H, 7.55%

The last six steps Examples 5–11 produced an overall yield of 80.7% of the desired product.

Following the above procedure but substituting for 6,7,8,9-tetrahydro-5,8-dimethyl-3-methoxy-10-methylene-5,8-methano-5H-enzocycloheptene-7-ol an appropriate 6,7,8,9-tetrahydro-5,8-dialkyl-3-methoxy-10-methylene-5,8-methano-5H-benzocycloheptene-7-ol, one can obtain 6,7,8,9-tetrahydro-5-methyl-8-ethyl-3-methoxy-10-methylene-5,8-methano-5H-benzocycloheptene-7-one; m.p.=103°–104°C.; $\lambda_{max}^{CHCl_3}$= 5.75$\mu$(five-membered ketone), 6.03$\mu$(>C=CH$_2$); NMR (CDCl$_3$) 0.86 (t, 3H), $\delta$1.70 (s, 3H), $\delta$3.75 (s, 3H), $\delta$4.90 (s, 1H), $\delta$5.10 (s, 1H).

Mass spectrum showed the following major fragment ions: m/e 256 (M$^+$), 241, 203, 199, and 185 (base).

Analysis for $C_{17}H_{20}O_2$, 2,6.33 requires: C, 79.6,; H, 7.86%. found: C, 79.53; H, 7.64%.

6,7,8,9-Tetrahydro-5-methyl-8-propyl-3-methoxy-10-methylene-5,8-methano-5H-benzocycloheptene-7-one was obtained in similar fashion and recrystallized from ethanol; m.p. = 118.5°–119.5°C.; $\lambda_{max}^{CHCl_3}$ = 5.73$\mu$ (five-membered ring ketone), 6.0$\mu$ (>C=CH$_2$). NMR (CDCl$_3$) exhibited the following chemical shifts $\delta$0.99 (t,3H,—(CH$_2$)$_2$—CH$_3$), $\delta$1.69 (s, 3H), ≥C-CH$_3$), $\delta$3.77 (s, 3H, ≥—OCH$_3$), $\delta$4.91 and 5.09 (singlets, 2H for >C=CH$_2$). Mass spectrum showed the following major fragment-ions m/e 270 (M$^+$), 255 (base), 241, 227, 213, 199, 185, 171.

Other compounds preparable by the above procedure include 6,7,8,9-tetrahydro-8-methyl-5-ethyl3-methoxy-10-methylene-5,8-methano-5H-benzocycloheptene-7-one and 6,7,8,9-tetrahydro-5,8-diethyl-3-methoxy-10-methylene-5,8-methano-5H-benzocycloheptene-7-one.

EXAMPLE 12

6,7,8,9-Tetrahydro-5,8,10-trimethyl-3-methoxy-5,8-methano-5H-benzocycloheptene-7-one

PROCEDURE A

A solution of 22.4 g. of 6,7,8,9-tetrahydro-5,8-dimethyl-3-methoxy-10-methylene-5,8-methano-5H-benzocycloheptene-7-one in 350 ml. of ethanol was catalytically reduced over 5 g. of prehydrogenated Pd/C catalyst at atmospheric pressure. (Other catalysts e.g. Pt, Ni, were also useful to hydrogenate the exomethylene group). After the hydrogenation had been completed, the catalyst was separated by filtration, and the reaction mixture was evaporated to a colorless syrup.

The crude reaction mixture was purified by distillation at 120°–125°C./0.01 mm. Hg.; $\lambda_{max}^{film}$=5.73$\mu$(ketone), and a 3:2 mixture of the cis- and trans- $C_5/C_{10}$-Me stereoisomers of 6,7,8,9-tetrahydro-5,8,10-trimethyl-3-methoxy-5,8-methano-5H-benzocyclohepten-7-one was obtained in high yield. NMR spectrum of the $C_5/C_{10}$-Me - cis isomer exhibited chemical shifts at $\delta$0.84 (d, 3H; J=7 cps), $\delta$1.07 (s, 3H), $\delta$1.47 (s, 3H), $\delta$3.77 (s, 3H). The NMR spectrum of $C_5/C_{10}$-Me = trans isomer possessed chemical shifts at $\delta$1.00 (d, 3H; J=7 cps), $\delta$1.12 (s, 3H), $\delta$1.51 (s, 3H), $\delta$3.77 (s, 3H).

Analysis for $C_{16}H_{20}O_2$, 244.32 requires: C, 78.65; H, 8.25%. found: C, 78.93; H, 8.60%.

Following the above procedure, but substituting for 6,7,8,9-tetrahydro-5,8-dimethyl-3-methoxy-10-methylene-5,8-methano-5H-benzocycloheptene-7-one the appropriate 6,7,8,9-tetrahydro-5,8-dialkyl-3-methoxy-10-methylene-5,8-methano-5H-benzocycloheptene-7-one, one can obtain 6,7,8,9-tetrahydro-5,10-dimethyl-8-ethyl-3-methoxy-5,8-methano-5H-benzocycloheptene-7-one; b.p.=110°C./0.005 mm. Hg.; $\lambda_{max}^{CHCl_3}$ = 5.80$\mu$(ketone). NMR spectrum of the $C_5/C_{10}$-Me = cis isomer (CDCl$_3$) exhibited shifts at $\delta$0.83 (t, 3H), $\delta$0.81 (d, 3H; J=7 cps), $\delta$1.52 (s, 3H), $\delta$3.76 (s, 3H). The NMR spectrum of the $C_5/C_{10}$-Me = trans isomer (CDCl$_3$) possessed chemical shifts at $\delta$1.00 (d, 3H; J=7 cps), $\delta$1.52 (s, 3H), $\delta$3.76 (s, 3H).

Reduction of 6,7,8,9-tetrahydro-5-methyl-8-ethyl-3-methoxy-10-methylene-5,8-methano-5H-benzocycloheptene-7-one with Pd-C (10%) catalyst led to a 2:3 mixture of cis- and trans- $C_5/C_{10}$-Me-stereoisomers. Reduction with PtO$_2$ catalyst provided a 4:1 mixture of the cis- and trans-diastereoisomers.

Mass spectrum showed the following major fragment ions: m/e 258 (M$^+$, base), 243, 229, 215, 201, 187 and 175.

Analysis for $C_{17}H_{22}O_2$, 258.35 requires: C, 79.03; H, 8.58%. found: C, 79.03; H, 8.84%.

6,7,8,9-Tetrahydro-5,10-dimethyl-8-propyl-3-methoxy-5,8-methano-5H-benzocycloheptene-7-one was prepared in similar fashion and was isolated after recrystallization from hexene; m.p. = 51°–55°C. Glc analysis on Se-30 column showed that the ratio of the axial and equatorial diastereoisomer is 91:9. $\lambda_{max}^{CHCl_3}$ = 5.75$\mu$ (five-membered ring ketone); NMR spectrum (CDCl$_3$) showed no chemical shift for the vinyl protons. A triplet for the CH$_3$ group of the propyl sidechain and the two sets of doublets for the axial and equatorial $C_{10}$—CH$_3$ protons were not completely resolved. However, the $C_5$—CH$_3$ protons of the two diastereoisomers exhibited two singlets corresponding to the methyl protons at $\delta$1.53 (s ≥C—CH$_3$) and $\delta$1.48 (s, ≥C—CH$_3$), respectively. Mass spectrum possessed the following major fragment-ions m/e 272 (m$^+$), 257, 243, 229, 215, 201, 199, 187, 175 (base).

Analysis for $C_{18}H_{24}O_2$, 272.37 requires: C, 79.37, H, 8.88%. found: C, 79.60, H, 8.91%.

Other compounds preparable by following the above procedure include 6,7,8,9-tetrahydro-10-methyl-5-ethyl-8-n-propyl-3-methoxy-5,8-methano-5H-benzocycloheptene-7-one, 6,7,8,9-tetrahydro-8,10-dimethyl-5-ethyl-3-methoxy-5,8-methano-5H-benzocycloheptene-7-one and 6,7,8,9-tetrahydro-10-methyl-5,8-diethyl-3-methoxy-5,8-methano-5H-benzocycloheptene-7-one.

EXAMPLE 13

6,7,8,9-Tetrahydro-5,8-dimethyl-3-methoxy-7-(tetrahydro-2-pyranyloxy)-10-hydroxymethyl-5,8-methano-5H-benzocycloheptene A solution of 26 ml. of 1 molar diborane in tetrahydrofuran was slowly dropped into a solution of 17.3 g. of 6,7,8,9-tetrahydro-5,8-dimethyl-3-methoxy-7-(tetrahydro-2-pyranyloxy)-10-methylene-5,8-methano-5H-benzocycloheptene dissolved in 50 ml. of dry tetrahydrofuran held between 0° and 15°C. After the addition had been completed, the reaction mixture was stirred at room temperature for about 1 hour and then decomposed with ice. The mixture was next treated below +18°C. with 20 ml. of 10% sodium hydroxide and 10 ml. of 30% $H_2O_2$. The consequent reaction mixture was stirred at room temperature for about 3 hours, and was then exhaustively extracted with chloroform. Evaporation of the combined chloroform extracts to dryness gave crude 6,7,8,9-tetrahydro-5,8-dimethyl-3-methoxy-7-(tetrahydro-2-pyranyloxy)-10-hydroxymethyl-5,8-methano-5H-benzocycloheptene in practically quantitative yield; $\lambda_{max}^{film} = 2.95\mu$ (very strong—OH); there was no absorption band at $6.07\mu$ for the exomethylene group.

Following the above procedure, but substituting for 6,7,8,9-tetrahydro-5,8-dimethyl-3-methoxy-7-(tetrahydro-2-pyranyloxy)-10-methylene-5,8-methano-5H-benzocycloheptene an appropriate 6,7,8,-9-tetrahydro-5,8-dialkyl-3-methoxy-7-(tetrahydro-2-pyranyloxy)-10-methylene-5,8-methano-5H-benzocycloheptene, one can obtain 6,7,8,9-tetrahydro-5-methyl-8-n-propyl-7-(tetrahydro-2-pyranyloxy)-10-hydroxymethyl-5,8-methano-5H-benzocycloheptene, 6,7,8,9-tetrahydro-5-methyl-8-ethyl-3-methoxy-7-(tetrahydro-2-pyranyloxy)-10-hydroxymethyl-5,8-methano-5H-benzocycloheptene, 6,7,8,9-tetrahydro-8-methyl-5-ethyl-3-methoxy-7-(tetrahydro-2-pyranyloxy)-10-hydroxymethyl-5,8-methano-5H-benzocycloheptene and 6,7,8,9-tetrahydro-5,8-diethyl-3-methoxy-7-(tetrahydro-2-pyranyloxy)-10-hydroxymethyl-5,8-methano-5H-benzocycloheptene.

EXAMPLE 14

6,7,8,9-Tetrahydro-5,8-dimethyl-3-methoxy-7-(tetrahydro-2-pyranyloxy)-10-tosyloxymethyl-5,8-methano-5H-benzocycloheptene A solution of 2.0 g. of 6,7,8,9-tetrahydro-5,8-dimethyl-3-methoxy-7-(tetrahydro-2-pyranyloxy)-10-hydroxymethyl-5,8-methano-5H-benzocycloheptene in 30 ml. of cold pyridine was treated with 1.2 g. of p-toluenesulfonylchloride. The reaction mixture was stored in the cold for 24 hours, and was poured onto ice. The resulting mixture was diluted with 10% hydrochloric acid. The slightly acidic solution was extracted with ether. Evaporated of the ether therefrom yielded 6,7,8,9-tetrahydro-5,8-dimethyl-3-methoxy-7-(tetrahydro-2-pyranyloxy)-10-tosyloxymethyl-5,8-methano-5H-benzocycloheptene; $\lambda_{max}^{film} = 3.47\mu$ (very strong CH), 7.37 and $8.50\mu$ (—$SO_2$—) and there was no band for —OH absorption.

Following the above procedure, but substituting for 6,7,8,9-tetrahydro-5,8-dimethyl-3-methoxy-7-(tetrahydro-2-pyranyloxy)-10-hydroxymethyl-5,8-methano-5H-benzocycloheptene an appropriate 6,7,8,-9-tetrahydro-5,8-dialkyl-3-methoxy-7-(tetrahydro-2-pyranyloxy)-10-hydroxymethyl-5,8-methano-5H-benzocycloheptene, one can obtain 6,7,8,9-tetrahydro-5-methyl-8-ethyl-3-methoxy-7-(tetrahydro-2-pyranyloxy)-10-tosyloxymethyl-5,8-methano-5H-benzocycloheptene; 6,7,8,9-tetrahydro-5-methyl-8-propyl-3-methoxy-7-(tetrahydro-2-pyranyloxy)-10-tosyloxymethyl-5,8-methano-5H-benzocycloheptene and 6,7,8,9-tetrahydro-5,8-diethyl-3-methoxy-7-(tetrahydro-2-pyranyloxy)-10-tosyloxymethyl-5,8-methano-5H-benzocycloheptene.

EXAMPLE 15

6,7,8,9-Tetrahydro-5,8,10-trimethyl-3-methoxy-5,8-methano-5H-benzocycloheptene-7-ol A solution of 24.4 g. of 6,7,8,9-tetrahydro-5,8-dimethyl-3-methoxy-7-(tetrahydro-2-pyranyloxy)-10-tosyloxymethyl-5,8-methano-5H-benzocycloheptene in 200 ml. of dry tetrahydrofuran was slowly introduced into a slurry of 5 g. of $LiAlH_4$ in 125 ml. of dry tetrahydrofuran. The resulting mixture was refluxed for 16 hours. The reaction mixture was decomposed with an ice-water mixture followed by 10% hydrochloric acid which treatment also served to hydrolyze the tetrahydropyranyl-ether group. The reaction mixture was extracted with ether. Evaporation of the ether solvent gave a practically quantitative yield of crude 5,8,10-trimethyl-5,8-methano-5H-benzocycloheptene-7-ol; $\lambda_{max}^{film} = 2.98\mu$ (very strong —OH).

Following the above procedure, but substituting for 6,7,8,9-tetrahydro-5,8-dimethyl-3-methoxy-7-(tetrahydro-2-pyranyloxy)-10-tosyloxymethyl-5,8-methano-5H-benzocycloheptene an appropriate 6,7,8,-9-tetrahydro-5,8-dialkyl-3-methoxy-7-(tetrahydro-2-pyranyloxy)-10-tosyloxymethyl-5,8-methano-5H-benzocycloheptene, one can obtain 6,7,8,9-tetrahydro-5,10-dimethyl-3-methoxy-8-n-propyl-5,8-methano-5H-benzocycloheptene-7-ol, 6,7,8,9-tetrahydro-5,10-dimethyl-8-ethyl-3-methoxy-5,8-methano-5H-benzocycloheptene-7-ol, 6,7,8,9-tetrahydro-8,10-dimethyl-5-ethyl-3-methoxy-5,8-methano-5H-benzocycloheptene-7-ol and 6,7,8,9-tetrahydro-10-methyl-5,8-diethyl-3-methoxy-5,8-methano-5H-benzocycloheptene-7-ol.

EXAMPLE 16

6,7,8,9-Tetrahydro-5,8,10-trimethyl-3-methoxy-5,8-methano-5H-benzocycloheptene-7-one

PROCEDURE B

A solution of 16.0 g. of 6,7,8,9-tetrahydro-5,8,10-trimethyl-3-methoxy-5,8-methano-5H-benzocycloheptene-7-ol in 100 ml. of pyridine was slowly added to a slurry of 13.0 g. of $CrO_3$ in 150 ml. of pyridine. The reaction mixture was kept at room temperature with stirring for an additional 16 hours. The reaction mixture was filtered, the filtrate was evaporated to a dark syrup which was dissolved in ether, and the ether solution extracted with 10% hydrochloric acid. Evaporation of the ethereal solution yielded crude 6,7,8,9-tetrahydro-5,8,10-trimethyl-3-methoxy-5,8-methano-5H-benzocycloheptene-7-one in practically quantitative yield. Distillation of an aliquot of the syrup at 130°–135°C./0.01 mm. Hg. gave the pure $C_5/C_{10}$-trans-stereoisomer of 6,-7,8,9-tetrahydro-5,8,10-trimethyl-3-methoxy-5,8- methano-5H-benzocycloheptene-7-one. NMR spectrum was identical with the sample obtained by a different route in Example 12 and exhibited chemical shifts for the $C_5/C_{10}$-trans-dimethyl groups at δ1.03 p.p.m. (d, J=7 cps; $C_{10}$—CH$_3$); δ1.12 (s, $C_8$—Ch$_3$); δ1.51 p.p.m. (singlet, for $C_5$—CH$_3$) and δ3.77 (s; —OCH$_3$).

Following the above procedure, but substituting for 6,7,8,9-tetrahydro-5,8,10-trimethyl-3-methoxy-5,8-methano-5H-benzocycloheptene-7-ol, an appropriate 6,7,8,9-tetrahydro-5,8, 10-trialkyl-3-methoxy-5,8-methano-5H-benzocycloheptene-7-ol, one can obtain 6,7,8,9-tetrahydro-5,10-dimethyl-8-ethyl-3-methoxy-5,8-methano-5H-benzocycloheptene-7-one, m.p.=74°–75° (from pentane), 6,7,8,9-tetrahydro-5,10-dimethyl-8-n-propyl-3-methoxy-5,8-methano-5H-benzocycloheptene-7-one; m.p. = 118.5°–119.5°C. (ethanol) 6,7,8,9-tetrahydro-8,10-dimethyl-5-ethyl-3-methoxy-5,8-methano-5H-benzocycloheptene-7-one and 6,7,8,9-tetrahydro-10-methyl-5,8-diethyl-3-methoxy-5,8-methano-5H-benzocycloheptene-7-one.

EXAMPLE 17

6,7,8,9-Tetrahydro-5,8,10-trimethyl-3-methoxy-5,8-methano-5H-benzocycloheptene-7-one oxime A solution of 22.7 g. of 6,7,8,9-tetrahydro-5,8,10-trimethyl-3-methoxy-5,8-methano-5H-benzocycloheptene-7-one in 60 ml. of methanol containing a 1.5 mol equivalent amount of hydroxylamine acetate was refluxed for about 5 hours. The reaction mixture was evaporated to dryness, and the residue extracted with ether. The dried ethereal layer gave 23.0 g. of a gum on evaporation to dryness. Recrystallization of the gum from ether-hexane yielded the pure oxime which melted at 144.5°–145.5°C.; $\lambda_{max}^{KBr} = 3.05\mu$(OH). NMR spepctrum exhibited chemical shifts for its $C_{10}$—CH$_3$-protons at δ0.75 (d, J=7cps), which indicates a $C_5/C_{10}$-cis-dimethyl configuration. Mass spectrum exhibited the following major fragment ions: m/e 259 (M$^+$), 224, 242 (base), 201.

Analysis for $C_{16}H_{21}NO_2$, 259.33: requires: C, 74.10; H, 8.16; N, 5.40%. found: C, 73.94; H, 7.96; N, 5.23%.

A similar procedure starting from the trans-$C_5/C_{10}$-dimethyl diastereoisomer from Example 16, yielded the isomeric oxime, m.p.=190°–193°C. NMR spectrum verified the transstereochemistry of the $C_5/C_{10}$-methyl groups possessing chemical shifts for its $C_{10}$-methyl protons at δ0.94 (d, 3H; J=7 cps).

Following the above procedure but substituting for 6,7,8,9-tetrahydro-5,8,10-trimethyl-3-methoxy-5,8-methano-5H-benzocycloheptene-7-one an appropriate 6,7,8,9-tetrahydro-5,8,10-trialkyl-3-methoxy-5,8-methano-5H-benzocycloheptene-7-one, one can obtain 6,7,8,9-tetrahydro-5,10-dimethyl-8-ethyl-3-methoxy-5,8-methano-5H-benzocycloheptene-7-one oxime. The trans-$C_5/C_{10}$-Me isomer melted at 195.5°–196.5°C.; $\lambda_{max}^{CHCl_3} = 3.0\mu$(broad—OH); 100 MHz NMR spectrum in CDCl$_3$ showed chemical shifts at δ0.96 (t, 3H), δ1.41 (s, 3H), δ1.69 (q, 2H), δ2.04 (q, 1H), δ3.77 (s, 3H). The cis-$C_5/C_{10}$-Me isomer melted at 126.5°–132.5°C. NMR spectrum indicated a mixture of 87% cis- and 13% trans- isomers. NMR spectrum of the pure cisisomer exhibited chemical shifts at δ0.74 (t, 3H), δ1.45 (s, 3H) and δ3.75 (s. 3H).

Mass spectrum of the oxime showed the following fragment peaks: m/e 273 (M$^+$), 258, 256, 215 (base), 187, 186.

Analysis for $C_{17}H_{23}NO_2$, 273.36: requires: C, 74.69; H, 8.48; N, 5.12%. found: C, 74.76; H, 8.64; N, 5.30%.

6,7,8,9-Tetrahydro-5,10-dimethyl-8-n-propyl-3-methoxy-5,8-methano-5H-benzocycloheptene-7-one oxime was prepared in similar fashion; m.p. 158°–161°C. (from benzene-heptane); $\lambda_{max}^{CHCl_3} = 2.80, 3.00\mu$ (—OH). Mass spectrum possessed the following major fragment-ions m/e 287 (M$^+$), 272, 229 (base), 200, 187, 172.

Analysis for $C_{18}N_{25}NO$, 287.39:
requires: C, 75.22; H, 8.77; N, 4.87%. found: C, 75.41; H, 8.57; N, 4.86%.

6,7,8,9-Tetrahydro-8,10-dimethyl-5-ethyl-3-methoxy-5,8-methano-5H-benzocycloheptene-7-one oxime and 6,7,8,9-tetrahydro-10-methyl-5,8-diethyl-3-methoxy-5,8-methano-5H-benzocycloheptene-7-one-oxime can be obtained in similar fashion.

EXAMPLE 18

1,2,3,4,5,6-Hexahydro-2,6-11-trimethyl-8-methoxy-2,6-methano-3-benzazocine-4-one An ice-cold solution of 25.9 g. of the cis-$C_5/C_{10}$-dimethyl diastereoisomer of 6,7,8,9-tetrahydro-5,8,10-trimethyl-3-methoxy-5,8-methano-5H-benzocycloheptene-7-one oxime in 500 ml. of pyridine was treated with 19.0 g. p-tosylchloride and the resulting mixture stirred at 0°C. for 16 hours. The mixture was allowed to warm up to room temperature at which temperature it was maintained for 24 hours. The reaction mixture was evaporated in vacuo at 30°C. bath temperature to a syrup which was dissolved in benzene. The benzene solution was extracted with 10% hydrochloric acid and water and dried. Evaporation of the benzene yielded about 35–40% of the cis-$C_6/C_{11}$-Me isomer lactam. Recrystallization from ethylacetate hexane yielded purified cis lactam; m.p.=200°–201.5°C.; $\lambda_{max}^{KBr} = 3.20\mu$ (sharp NH); 6.03$\mu$(strong—CO—NH). 100 NMR spectrum in DMSO-d$_6$ exhibited the diamagnetically shifted $C_{11}$-methyl protons at δ0.79 (d, 3H).

Mass spectrum showed the following fragmentation: m/e 259 (M$^+$), 244, 200, 161, 138.

Analysis for $C_{16}H_{21}NO_2$, 259.33: requires: C, 74.10; H, 8.16; N, 5.40%. found: C, 73,87; H, 8.37; N, 5.38%.

Similar Beckmann rearrangement of the $C_5/C_{10}$-transdimethyl oxime diastereoisomer yielded the $C_6/C_{11}$-transdimethyl diastereoisomer of 1,2,3,4,5-hexahydro-2,6,11-trimethyl-8-methoxy-2,6-methano-3-benzazocine-4-one m.p.=209.5°–210°C. NMR spectrum verified the trans-diequatorially oriented $C_6/C_{11}$-methyl groups by exhibiting the $C_{11}$-methyl protons at δ0.96 (d, 3H) in DMSO-d$_6$ solution.

Following the above procedure, but substituting for 6,7,8,9-tetrahydro-5,8,10-trimethyl-3-methoxy-5,8-methano-5H-benzocycloheptene 7-one oxime an appropriate 6,7,8,9-tetrahydro-5,8,10-trialkyl-3-methoxy-5,8-methano-5H-benzocycloheptene-7-one oxime, one can obtain 1,2,3,4,5,6-hexahydro-6,11-dimethyl-2-ethyl-8-methoxy-2,6-methano-3-benzazocine-4-one. The cis-$C_6/C_{11}$-methyl diastereoisomer lactam was recrystallized from CHCl$_3$-ether; m.p.=164°–167°C. $\lambda_{max}^{mull} = 3.20\mu$(NH), 6.05$\mu$(—CO—NH).

Mass spectrum possessed a weak molecular ion: 273 (M$^+$) and the following major fragment ions: m/e 258 (base), 215, 214, 187 and 175.

Analysis for $C_{17}H_{23}NO_2$, 273.36: requires: C, 74.69; H, 8.48; N, 5.12%. found: C, 74.46; H, 8.21; N, 5.03%.

The trans-$C_6/C_{11}$-methyl stereoisomer lactam melted at 285°–286°.

Similar Beckmann-rearrangement of 6,7,8,9-tetrahydro-5,10-dimethyl-8-n-propyl-3-methoxy-5,8- methano-5H-benzocycloheptene-7-one oxime provided 1,2,3,4,5,6-hexahydro-trans-6,11-dimethyl-2-n-propyl-8-methoxy-2,6-methano-3-benzazocine-4-one, m.p. 259°–261°C. (from ethanol) and the cis-diastereoisomer lactam, m.p. 159°–166°C. (from ethyl acetate-hexane). Both racemate pairs showed a closely related IR spectra; $\lambda_{max}^{CHCl_3}$ = 2.91μ (NH), 6.03μ (—NH—CO—). Mass spectrum showed the following major fragment-ions m/e 287 (M⁺), 272 (base), 244, 230, 188, 166.

Analysis for $C_{18}H_{25}NO_2$, 287.39: requires: C, 75.22; H, 8.77 N, 4.87%. found: C, 75.34; H, 8.68; N, 4.59%.

1,2,3,4,5,6-Hexahydro-2,11-dimethyl-6-ethyl-8-methoxy-2,6-methano-3-benzazocine-4-one, 1,2,3,4,5,6-hexahydro-11-methyl-6-ethyl-2-n-propyl-8-methoxy-2,6-methano-3-benzazocine-4-one and 1,2,3,4,5,6-hexahydro-11-methyl-2,6-diethyl-8-methoxy-2,6-methano-3-benzazocine-4-one can be prepared in similar fashion.

EXAMPLE 19

1,2,3,4,5,6-Hexahydro-2,6,11-trimethyl-8-methoxy-2,6-methano-3-benzazocine 17.0 g. of 1,2,3,4,5,6-hexahydro-2,6,11-trimethyl-8-methoxy-2,6-methano-3-benzazocine-4-one was added in small portions to a slurry of 10.0 g. lithium aluminumhydride in 700 ml. of dry tetrahydrofuran. The resulting mixture was refluxed for about 14 days. After conventional workup, crude 1,2,3,4,5,6-hexahydro-2,6,11-trimethyl-8-methoxy-2,6-methano-3-benzazocine was obtained. The crude amine was dissolved in ether, and the ether solution treated with dry ethereal hydrochloric acid. 1,2,3,4,5,6-Hexahydro-2,6,11-trimethyl-8-methoxy-2,6-methano-3-benzazocine hydrochloride thus formed was recrystallized from ethanol; m.p. = 272°–273°C. (dec.); $\lambda_{max}^{KBr}$ = 3.5–4.0μ(secondary amine salt.) 100 MHz NMR spectrum of the trans-$C_6$/$C_{11}$-methyl diastereoisomer obtained above in $CDCl_3$/$D_2O$/KOD solution exhibited chemical shifts at δ1.06 (d, 3H; $C_{11}$-equatorial methyl protons), δ1.18 (s, 3H) δ1.35 (s, 3H), δ3.78 (s, 3H).

100 MHz NMR spectrum of the cis-$C_6$/$C_{11}$-methyl isomeric amine obtained in similar fashion in $CDCl_3$/$D_2O$/KOD showed the diamagnetically shifted doublet for its $C_{11}$-methyl protons at δ0.80 (d, 3H) and chemical shifts at δ1.14 (s, 3H), 1.43 (s, 3H), δ3.78 (s, 3H).

Mass spectrum of the amine possessed the following fragment ion peaks: m/e 245 (M⁺), 230 (base), 216, 187, 174, 161.

Analysis for $C_{16}H_{24}NOCl$, 281.80: requires: C, 68.19; H, 8.58; N, 4.97%. found: C, 67.99, H, 8.49; N, 4.91%.

Following the above procedure, but substituting for 1,2,3,4,5,6-hexahydro-2,6,11-trimethyl-8-methoxy-2,6-methano-3-benzazocine-4-one an appropriate 1,2,3,4,5,6-hexahydro-2,6,11-trialky-8-methoxy-2,6-methano-3-benzazocine-4-one, one can obtain 1,2,3,4,5,6-hexahydro-6,11-dimethyl-2-ethyl-8-methoxy-2,6-methano-3-benzazocine, the hydrochloride salt of which melted at 284°–286°C.; $\lambda_{max}^{CHCl_3}$ = 3.55–4.0μ (secondary amine salt).

Analysis for $C_{17}H_{26}NOCl$, 295.83: requires: C, 69.02; H, 8.86; N, 4.73%. found: C, 68.81; H, 8.67; N, 4.70%.

1,2,3,4,5,6-Hexahydro-6,11-dimethyl-2-n-propyl-8-methoxy-2,6-methano-3-benzazocine was prepared in similar fashion and isolated as its hydrobromide salt; m.p. = 238.5°–240.5°C.

Similarly, 1,2,3,4,5,6-hexahydro-2,11-dimethyl-6-ethyl-8-methoxy-2,6-methano-3-benzazocine and 1,2,3,4,5,6-hexahydro-11-methyl-2,6-diethyl-8-methoxy-2,6-methano-3-benzazocine were prepared.

EXAMPLE 20

1,2,3,4,5,6-Hexahydro-2,6,11-trimethyl-2,6-methano-3-benzazocine-8-ol

Ten grams of 1,2,3,4,5,6-hexahydro-2,6,11-trimethyl-8-methoxy-2,6-methano-3-benzazocine hydrochloride were melted in an oil bath with 40 g. of pyridinium hydrochloride at a temperature in the range 170°–185°C. for 16 hours. The reaction mixture was cooled and dissolved in water. The aqueous solution was made alkaline by the addition of, ammonium hydroxide at 0°C., and the base insoluble material extracted into chloroform. The chloroform layer was separated and evaporated to dryness. The resulting residue was triturated with ether. 1,2,3,4,5,6-hexahydro-2,6,11-trimethyl-2,6-methano-3-benzazocine-8-ol thus obtained crystallized and was separated by filtration; m.p. = 235°–237°C. $\lambda_{max}^{mull}$ = 3.05μ, 4.0μ; NMR (DMSO-$d_6$) δ0.70 (d, 3H), δ1.07 (s, 3H), δ1.28 (s, 3H).

Mass spectrum exhibited the following fragmentation pattern: m/e 231 (m⁺), 216 (base), 202, 186, 173, 160, 145, 124.

Analysis for $C_{15}H_{21}NO$, 231.34: requires: C, 77.88; H, 9.15; N, 6.05%. found: C, 77.54; H, 8.96; N, 5,86%.

Following the above procedure, but substituting for 1,2,3,4,5,6-hexahydro-2,6,11-trimethyl-8-methoxy-2,6-methano-3-benzazocine an appropriate 1,2,3,4,5,6-hexahydro-2,6,11-trialkyl-8-methoxy-2,6-methano-3-benzazocine, one can obtain 1,2,3,4,5,6-hexahydro-6,11-dimethyl-2-ethyl-2,6-methano-3-benzazocine-8-ol; m.p.=238°–243°C. (from ethanol) and 1,2,3,4,5,6-hexahydro-6,11-dimethyl-2-n-propyl-2,6-methano-3-benzazocine-8-ol; m.p. 179°–81°C (isopropanol).

1,2,3,4,5,6-Hexahydro-2,11-dimethyl-6-ethyl-2,6-methano-3-benzazocine-8-ol and 1,2,3,4,5,6-hexahydro-11-methyl-2,6-diethyl-2,6-methano-3-benzazocine-8-ol can also can be obtained by the above procedure.

EXAMPLE 21

1,2,3,4,5,6-Hexahydro-3-(β-phenethyl)-2,6,11-trimethyl-2,6-methano-3-benzazocine-8-ol A suspension of 6.01 g. of 1,2,3,4,5,6-hexahydro-2,6,11-trimethyl-2,6-methano-3-benzazocine-8-ol in a mixture of 260 ml. of $CH_2Cl_2$ and 45 ml. $Et_3N$ was slowly treated with 12.0 g. (3 mole eq.) of freshly distilled phenylacetychloride and the resulting mixture refluxed for 16 hours. The yellow solution thus obtained was cooled and extracted by cold-dilute HCl. The organic layer was separated, dried and filtered. Evaporation of the solvent left the N,O-diacylated product as a yellow gum; $\lambda_{max}^{film}$ = 5.75λ(—O—CO—$CH_2$—Ph) and 5.95(>N—CO—$CH_2$—Ph).

The crude N,O-diacyl benzazocine thus prepared was reduced with 2.0 g. of $LiAlH_4$ in 350 ml. of refluxing THF. The pooled solution was diluted with 300 ml. of ether and carefully decomposed by adding an ice-water mixture. The solution was filtered to remove inorganic salts. The filtrate was dried and the solvents removed by evaporation. The residue was chromatographed over neutral alumina. The free base was eluted with chloroform. The corresponding hydrochloride salt was prepared: m.p.=160°–169°C.

A mass spectrogram of the hydrochloride salt did not show the expected molecular ion (M+335). Apparently, a benzyl group (M-91) was lost, giving rise to the following fragmentation pattern: m/e 187, 159, 141, 129, 105, 103, 91

Analysis calc. for $C_{23}H_{30}NOCl$: C, 74.20; H, 8.12; N, 3.76. Found: C, 74.02; H, 8.14; N, 3.64.

Following the above procedure but substituting for 1,2,3,4,5,6-hexahydro-2,6,11-trimethyl-2,6-methano-3-benzazocin-8-ol, 1,2,3,4,5,6-hexahydro-6,11-dimethyl-2-ethyl-2,6-methano-3-benzazocin-8-ol, 1,2,3,4,5,6-hexahydro-3-(β-phenethyl)-6,11-dimethyl-2-ethyl-2,6-methano-3-benzazcin-8-ol was prepared and crystallized as the hydrobromide salt from ethanol/ether: m.p.=183°–5°C.; $\lambda_{max}^{film}$ = 3.40, 3.48, 3.70–3.80μ(salt). Mass spectrograph showed no molecular ion at M+349. The fragmentation pattern shows a series of ions at m/e 348, 334 and 320.

Analysis calc. for $C_{24}H_{32}NOBr$: C, 66.97; H, 7.49; N, 3.25. Found: C, 67.06; H, 7.37; N, 3.38.

The tartrate salt of the above amine base was also prepared:

Analysis calc. for $C_{28}H_{37}NO_7$: C, 67.31; H, 7.47; N, 2.80. Found: C, 67.52; H, 7.45; N, 3.09.

EXAMPLE 22

1,2,3,4,5,6-Hexahydro-3-(β-phenethyl)-6,11-dimethyl-2-ethyl-2,6-methano-3-benzazocine-8-ol An alternate procedure to Example 21 was carried out as follows:

A mixture of 7.15 g. of 1,2,3,4,5,6-hexahydro-3-(β-phenethyl)-6,11-dimethyl-2-ethyl-8-methoxy-2,6-methano-3-benzazocine-hydrochloride prepared by the procedure of Example 23 and 35 g pyridinium-hydrochloride was heated at 170°C. for 6 hours. The cooled reaction mixture was dissolved in water, and the water solution neutralized with diluted $NH_4OH$ and extracted with chloroform. The dark chloroform solution was separated and evaporated in vacuo. The resulting residue was triturated with pentane. After several triturations with pentane, a solid foam remained with the chromatographed over neutral alumina using benzene as the eluant. 1,2,3,4,5,6-Hexahydro-3-(β-phenethyl)-6,11-dimethyl-2-ethyl-2,6-methano-3-benzazocine-8-ol thus prepared was converted to the hydrobromide salt in dry ether m.p. 183°–185°(dec) after recrystallization from an ethanol/ether mixture. The product was identical in all respects with the sample described in Example 21.

EXAMPLE 23

1,2,3,4,5,6-Hexahydro-3-(β-phenethyl)-2,6,11-trimethyl-8-methoxy-2,6-methano-3-benzazocine To a mixture of 2.79 g. of 1,2,3,4,5,6-hexahydro-2,6,11-trimethyl-8-methoxy-2,6-methano-3-benzazocine in 150 ml. of $CH_2Cl_2$ and 18 ml. of $Et_3N$ was slowly added 3.0 g. of phenacetylchloride. The reaction mixture was refluxed for 16 hours, cooled and then extracted with cold dilute hydrochloric acid. The organic layer was separated and the solvent evaporated to leave a gum film [$\lambda_{max}^{film}$ 6.1μ, (>N—CO—)] comprising the N-phenacetyl derivative which was reduced with 1.0 g. $LiAlH_4$ by the procedure of Example 21. 1,-2,3,4,5,6-Hexahydro-3-(β-phenethyl)-2,6,11-trimethyl-8-methoxy-2,6-methano-3-benzazocine was eluted with benzene and transformed into the corresponding hydrochloride salt. $\lambda_{max}^{CHCl_3}$ 4.0–41μ(tertiary amine salt).

The mass spectrum did not show the molecular ion (M+343), but had the following fragmentation pattern m/e 258, 245, 230, 201. 60 MHz n.m.r. spectrum in $CDCl_3$ exhibited the protons of the phenyl group at δ7.28 (s), as well as the protons of the trisubstituted aromatic nucleus at δ7.0 (m).

Following the above procedure, but substituting the secondary amine benzazocine component with an equimolar amount of 1,2,3,4,5,6-hexahydro-6,11-dimethyl-2-ethyl-8-methoxy-2,6-methano-3-benzazocine, one obtains 1,2,3,4,5,6-hexahydro-3-(β-phenethyl)-6,11-dimethyl-2-ethyl-8-methoxy-2,6-methano-3-benzazocine which was isolated in hydrochloride salt form; m.p. 208°–209°C. (dec.), (ethylacetate/ether). $\lambda_{max}^{CHCl_3}$ 4.07μ (broad, tertiary amine salt). 60 MHz n.m.r. spectrum in $CDCl_3$ exhibited chemical shifts at δ0.86 (d, 3H), δ3.81 (s, 3H), δ6.91 (m, 3H) trisubstituted aromatic protons), δ7.29 (s, 5H; —$C_6H_5$).

Mass spectrum did not show the molecular ion (M+363). The following major fragment ions were observed: m/e 272, 243, 229, 215, 187 and 173.

Analysis for $C_{25}H_{34}NO.Cl$, 400.01 requires: C, 75.07; H, 8.57; N, 3.50%. Found: C, 75.00; H, 8.82; N, 3.49%.

EXAMPLE 24

PREPARATION OF SALTS

Salts of the free bases of this invention, other than the hydrochloride or hydrobromide salts whose preparation is illustrated in the above examples, are prepared by dissolving the free base in ether and adding an equivalent of a suitable non-toxic acid, also in ether. The salts thus formed, as for example the sulfate and phosphate salts, are insoluble in ether and can be isolated by filtration. Alternatively, the amine base can be dissolved in ethanol and an equivalent of the acid added as an ethanolic solution. In this instance, since a majority of the salts thus formed are soluble in the reaction mixture, they are isolated by addition of ether or by evaporation of the solvent in vacuo. Purification is usually by recrystallization. Salts which can be formed by the above procedure include the sulfate, phosphate, hydrogen phosphate, dihydrogen phosphate, acetate, maleate, fumarate succinate, tartrate, citrate, lactate, benzoate, methane sulfonate and p-toluene sulfonate salts of the novel benzazocines of this invention.

As previously stated, the compounds of this invention are analgetics. For example, 1,2,3,4,5,6-hexahydro-2,6,11-trimethyl-3-(β-phenethyl)2,6-methano-3-benzazocine-8-ol is a pure analgetic, more powerful than pentazocine but without significant analgetic antagonist activity. The corresponding 8-methyl ether is also analgetically active, though not as active as the benzazocine-8-ol. The higher homologues, the 1,2,3,4,5,6-hexahydro-2-ethyl (or 2-propyl)-6,11-dimethyl-3-substituted-2,6-methano-3-benzazocine-8-ols and the corresponding 8-methoxy ethers are also active analgetics, with those derivatives having a free phenolic group at 8 being particularly active.

The compounds of this invention may be administered to mammals to produce analgesia either parenterally or orally. Pharmaceutical formulations for the administration of the compounds of this invention to mammals include the use of solid pharmaceutical forms such as tablets and pulvules or in liquid forms including solutions, suspensions or emulsions. Suitable liquid and solid carriers including water, gelatin, lactose, starch, talc, vegetable oils, alcohols, polyalcohols, gums, syrups and the like can be used. The pharmaceutical composition in addition to the active principle and carrier, may include auxiliary materials such as coloring or stabilizing agents, or wetting or emulsifying agents. It is, of course, recognized that the carrier as well as any other materials present, must be chemically and physiologically inert with respect to the active principle.

When the pharmaceutical preparation is compounded in the manner suggested above, it will contain an amount of from about 10–500 mg/ml of the vehicle of the analgesic substance. When so prepared, the novel compounds of this invention may be administered in therapeutic dosages of from about 10–200 mg/day to a mammal.

I claim:

1. A substituted benzazocine of the formula

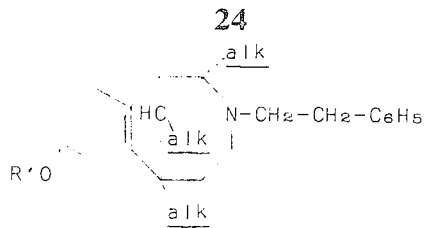

wherein each alk is independently $C_1$–$C_3$ alkyl and $R'$ is H or alk and pharmaceutically-acceptable acid additive salts thereof formed with non-toxic acids.

2. A compound according to claim 1, said compound being 1,2,3,4,5,6-hexahydro-2,6,11-trimethyl-3-($\beta$-phenethyl)-2,6-methano-3-benzazocine-8-ol.

3. A compound according to claim 1, said compound being 1,2,3,4,5,6-hexahydro-2-ethyl-6,11-dimethyl-3-($\beta$-phenethyl)-2,6-methano-3-benzazocine-8-ol.

* * * * *

UNITED STATES PATENT OFFICE
CERTIFICATE OF CORRECTION

PATENT NO. : 3,891,658
DATED : June 24, 1975
INVENTOR(S) : Stephen I. Sallay

It is certified that error appears in the above-identified patent and that said Letters Patent are hereby corrected as shown below: (Page 1 of 5)

In column 1, lines 15-25, the formula should read

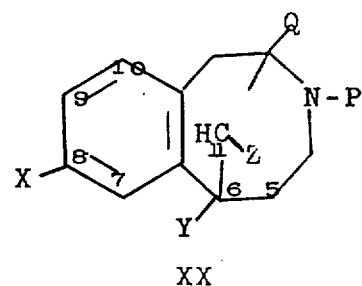

XX

In column 2, lines 37-45, the formula should read

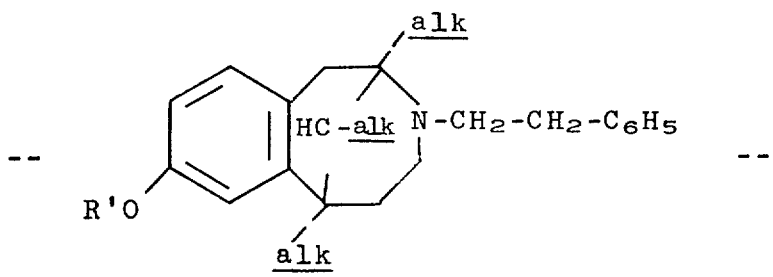

UNITED STATES PATENT OFFICE
CERTIFICATE OF CORRECTION

PATENT NO. : 3,891,658
DATED : June 24, 1975
INVENTOR(S) : Stephen I. Sallay

It is certified that error appears in the above-identified patent and that said Letters Patent are hereby corrected as shown below: (Page 2 of 5)

In column 3, lines 34-43, the formulas should read

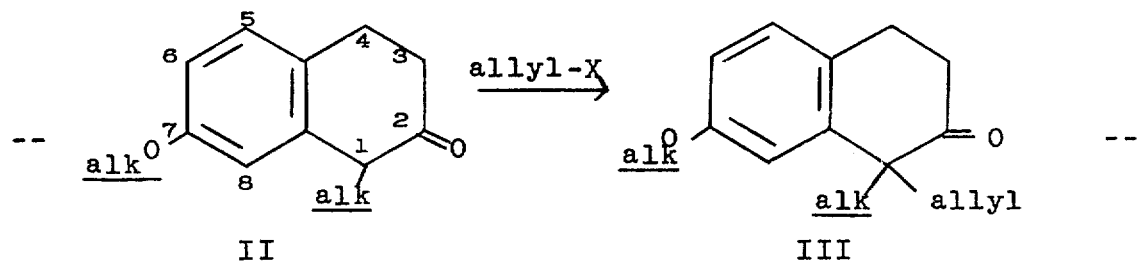

In columns 3 and 4, lines 52-68, the formulas should read

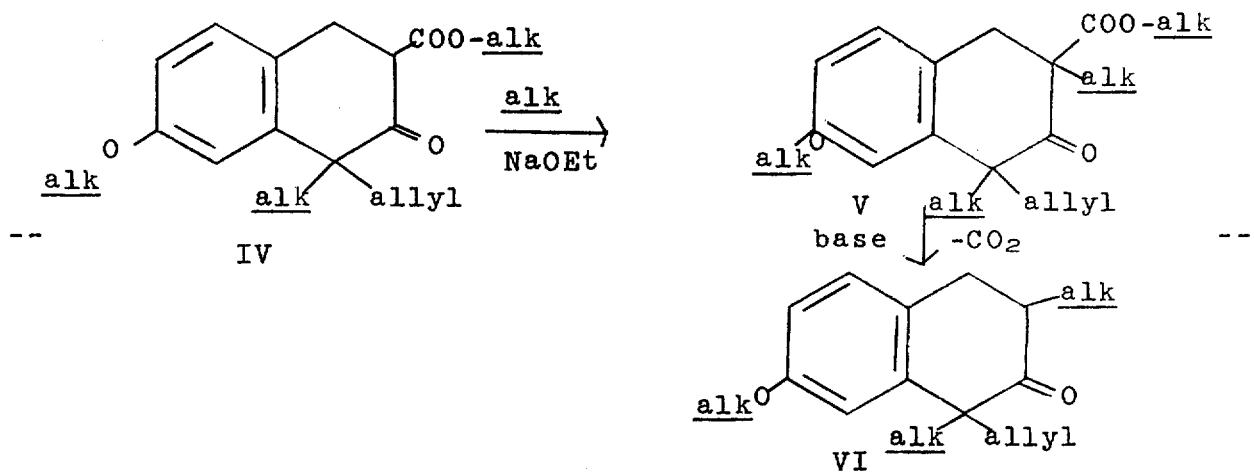

UNITED STATES PATENT OFFICE
CERTIFICATE OF CORRECTION

PATENT NO. : 3,891,658
DATED : June 24, 1975
INVENTOR(S) : Stephen I. Sallay

It is certified that error appears in the above-identified patent and that said Letters Patent are hereby corrected as shown below: (Page 3 of 5)

In column 4, lines 12-19, the formulas should read

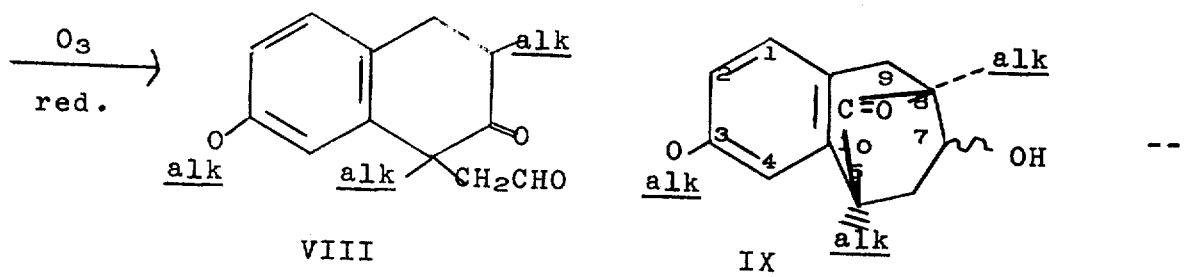

In columns 5 and 6, lines 1-17, the formulas should read

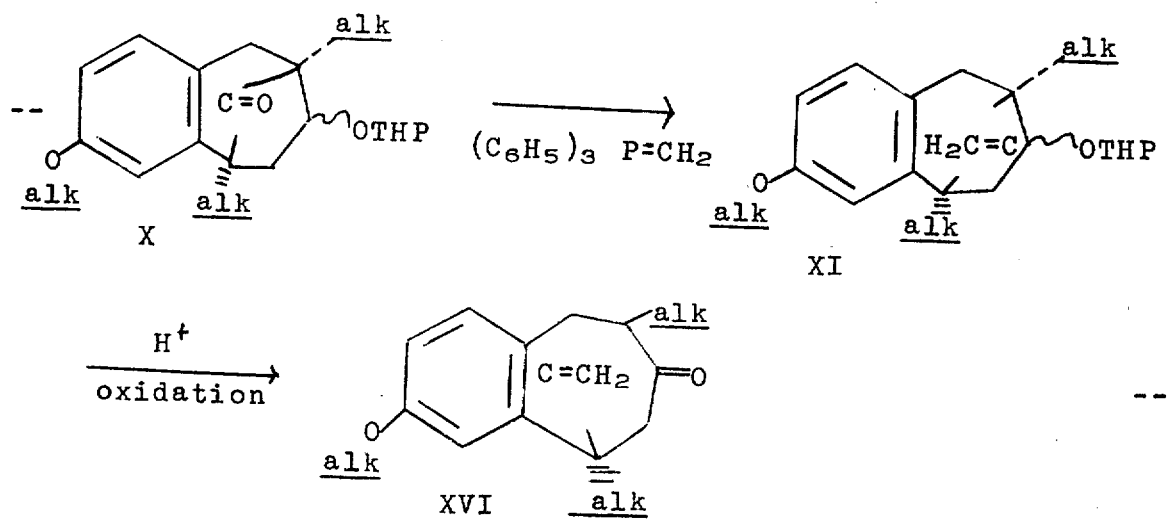

UNITED STATES PATENT OFFICE
CERTIFICATE OF CORRECTION

PATENT NO. : 3,891,658
DATED : June 24, 1975
INVENTOR(S) : Stephen I. Sallay

It is certified that error appears in the above-identified patent and that said Letters Patent are hereby corrected as shown below: (Page 4 of 5)

In column 5, lines 50-56, the formula should read

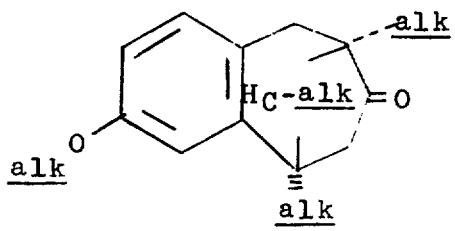

In column 6, lines 31-39, the formula should read

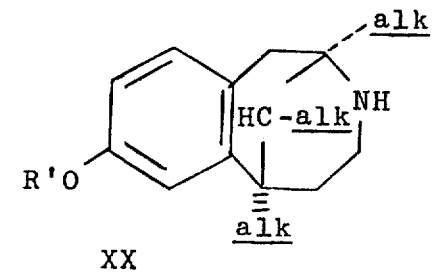

In column 12, line 64, "tetrahy-" should read -- tetrahydro- --.

UNITED STATES PATENT OFFICE
CERTIFICATE OF CORRECTION

PATENT NO. : 3,891,658
DATED : June 24, 1975
INVENTOR(S) : Stephen I. Sallay

It is certified that error appears in the above-identified patent and that said Letters Patent are hereby corrected as shown below: (Page 5 of 5)

In column 24, lines 1-7, the formula should read

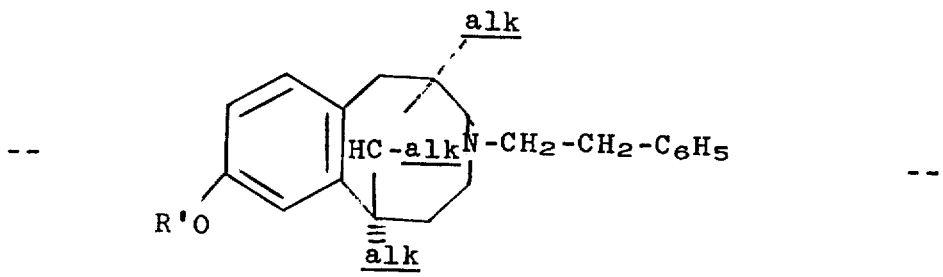

Signed and Sealed this sixteenth Day of December 1975

[SEAL]

Attest:

RUTH C. MASON
*Attesting Officer*

C. MARSHALL DANN
*Commissioner of Patents and Trademarks*